Oct. 31, 1961  M. W. LA RUE, JR  3,006,265
EXPOSURE CONTROL WITH DIFFRACTION COMPENSATION
Filed Aug. 7, 1959
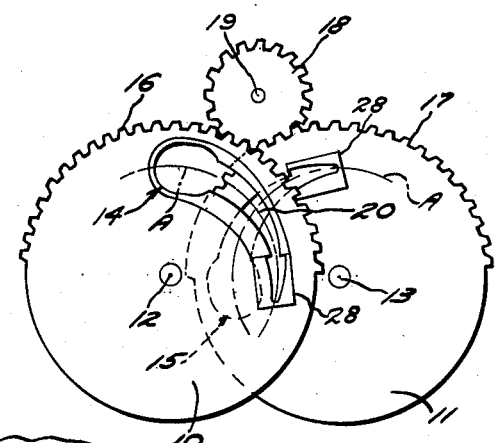
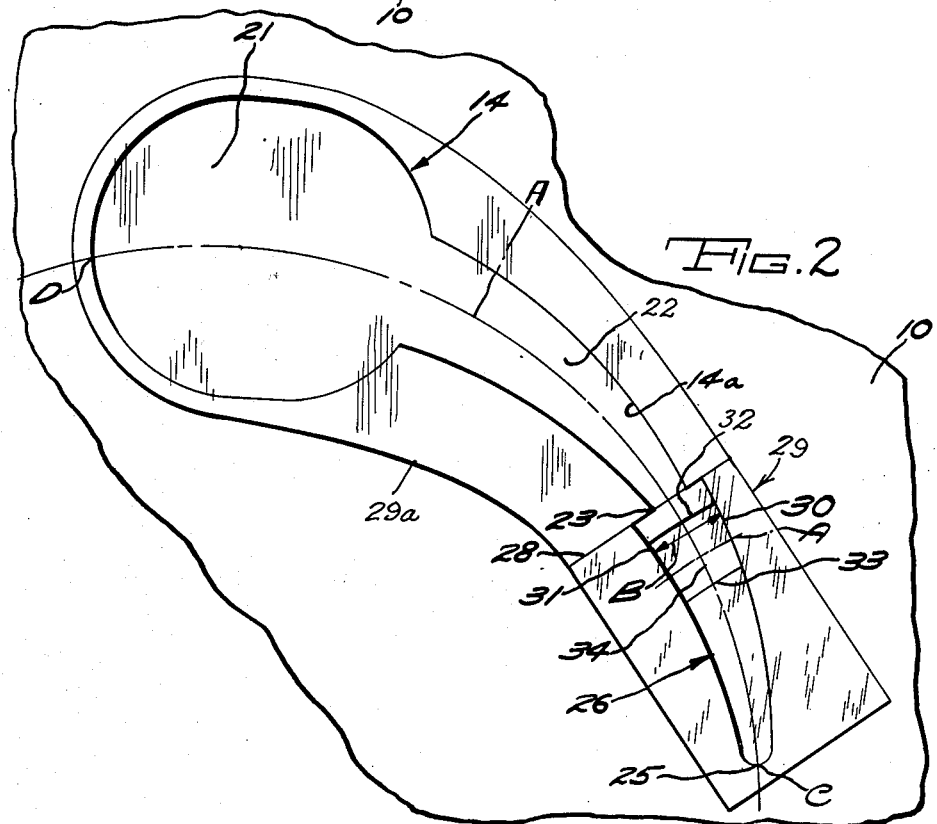

United States Patent Office 3,006,265
Patented Oct. 31, 1961

3,006,265
EXPOSURE CONTROL WITH DIFFRACTION COMPENSATION
Mervin W. La Rue, Jr., Barrington, Ill., assignor to Bell & Howell Company, Chicago, Ill., a corporation of Illinois
Filed Aug. 7, 1959, Ser. No. 832,198
3 Claims. (Cl. 95—64)

This invention relates generally to exposure control mechanisms for photographic cameras and more particularly relates to an improved exposure control mechanism in which vignetting of the light image impinged on the film at small diaphragm openings is considerably reduced.

It is a well known principle of physical optics that light waves which are transmitted through an aperture bend slightly or diffract about the edges of the aperture so that a diffraction pattern of alternate light and dark areas is formed on any surface disposed behind the aperture on which the light is impinged. The resultant image is somewhat fuzzy or blurred due to the diffraction of light waves about the edges of the aperture.

The degree of blurriness is, however, a function of the ratio of the perimeter of the aperture to the amount of light transmitted therethrough (that is, to the area of the aperture). Accordingly, by increasing the area of the aperture the degree of blurriness is considerably reduced since the amount of diffraction or number of diffracted light waves represents a smaller proportion of the total amount of light transmitted through the aperture.

With regard to photographic cameras it is desirable to provide a means for decreasing the amount of light transmitted to the film without unnecessarily increasing the proportion of diffracted light relative to the total amount of light impinged on the film.

In view of the foregoing, I have devised an exposure control mechanism which comprises generally a pair of selectively movable iris blades having a tapered or wedge-like exposure aperture formed therein, one blade of which has a transparent light filter mounted thereon over the exposure aperture. In view of the foregoing, by using a filter which is effective to transmit therethrough only 50% of the light falling therein, the area of the exposure aperture may be doubled in size thus permitting the same amount of light transmission but reducing the proportion of diffracted light waves. By using a very thin filter, diffusion of light passing therethrough is reduced to an almost negligible amount so that the clarity of the image impinged on the film is substantially inversely proportional to the percentage of diffracted light waves in the light transmitted through the exposure aperture.

Although possible, it would not ordinarily be desirable to enlarge the tapered openings in the cooperating blades throughout their entire length since at "wide open" positions the area of the enlarged exposure aperture would require the provision of a very large lens and the expense of producing such a lens would ordinarily preclude its use. Furthermore, the proportion of diffracted light waves to the total amount of light transmitted is not great at large aperture settings with the result that the diffraction compensation is not essential at such settings. On the contrary, the proportion of diffracted light waves to the total amount of light transmitted is excessive at very small aperture openings so that some compensation in this area is desirable to produce a clear image on the film. Obviously, therefore, at some intermediate point it becomes particularly desirable to effect diffraction compensation. I have found it desirable to effect diffraction compensation wherever the area of the diaphragm opening is less than .050 of an inch or smaller. Thus, when the exposure control mechanism is utilized in conjunction with a camera having a ten millimeter lens, I have found it most desirable to effect diffraction compensation at *f*-stop openings of *f*/11 or smaller and have hereafter set forth in the specification and in the appended drawings an exposure control mechanism which is so arranged.

It is, therefore, a principal object of the present invention to provide an improved exposure control mechanism for photographic cameras having a means associated therewith for clarifying the image impinged on the film.

A further and important object of the invention is to provide a means for decreasing the proportion of diffracted light waves to the total amount of light transmitted through an aperture.

Yet another object of the invention is to provide an exposure control mechanism which includes in combination an iris blade having a tapered aperture therein and having a filter disposed over the aperture which is effective to block the transmission of a predetermined percentage of light therethrough which iris blade is cooperable with a second selectively movable apertured iris blade to define a diaphragm opening.

Another important feature of the present invention resides in the provision of a pair of cooperating overlapping iris blades having generally arcuately shaped apertures formed therein which are cooperable to define a diaphragm opening in which at least one of the blades has a filter mounted thereon over at least a portion of its respective aperture and in which the aperture within that respective blade is formed of greater width relative to the remainder of the aperture as a function of the density of the filter.

These and other objects of the invention will appear from time to time as the following specification proceeds and with reference to the accompanying drawings, wherein:

FIGURE 1 is a front elevational view of a pair of cooperating iris blades which are adapted to be mounted in a photographic camera and which are constructed in accordance with the principles of the present invention; and FIGURE 2 is an enlarged view of one of the iris blades of the present invention showing suitable construction lines.

In the embodiment of the invention illustrated in the drawings, a diaphragm opening control mechanism is shown as comprising generally a pair of cooperating iris blades 10 and 11 which are adapted to be mounted in overlapping relationship with respect to one another about transversely displaced spindles 12 and 13, respectively, in a photographic camera.

Teardrop or substantially wedge-shaped apertures 14 and 15 are formed within the blades 10 and 11, respectively, and are formed in symmetrical segments about an arc line A of the respective iris blades.

The blades 10 and 11 have gear racks 16 and 17 formed in the peripheral edges thereof which are cooperable with and drivingly engaged by a drive gear 18 which, in turn, is mounted for rotatable movement on a spindle 19 spaced transversely and equidistant from the spindles 12 and 13.

It will be noted that the apertures 14 and 15 in the iris blades 10 and 11 are disposed in overlapping relationship with one another and are cooperable to define a diaphragm opening or exposure aperture 20. Due to the taper of the apertures 14 and 15 rotation of the drive gear 18 will rotatably move the iris blades 10 and 11 about the spindles 12 and 13 to vary the area of the diaphragm opening 20. Rotation of the drive gear 18 may be effected by manual means or by means of an automatic exposure control mechanism comprising a means for rotating the gear 18 in response to the intensity of light impinging on a photoelectric cell but the means for rotating gear 18 forms no part of the present invention so is not hereinafter described or illustrated in the appended drawings.

Referring especially to FIGURE 2, the aperture 14 which is formed within the iris blade 10 is partially formed of standard design and includes an enlarged eye 21 which opens to an elongated arcuately shaped taper 22. The arc line A is constructed by a radial line extending from the center axis of spindle 12 of the blade 10, and is shown merely as a construction line to facilitate an understanding of the present invention. The converging portion or taper 22 tapers uniformly from the enlarged eye 21 on opposite sides of the arc line A and terminates at a narrow neck 23. The remaining portion of the aperture is so formed that the edges 14a of the blade 10 defining the aperture 14 are cut away a greater distance from the arc line A than the edges defining that portion of the taper 22 of the aperture adjacent the neck 23 and thereafter taper uniformly about the arc line A at the same rate of convergence as the edges 14a to a vertex 25.

It is important to understand that the rate of convergence of the edges of the blade 10 defining the tail 26 of aperture 14 is substantially the same as the rate of convergence of the edges 14a defining the taper 22.

That portion of the arc line A which is disposed intermediate the opposite end portions of the elongated exposure aperture 14, that is between points C and D, is designated, for illustrative purposes, as the major axis of the aperture while the minor axis of the aperture is designated by a line extending intermediate opposite edge portions of the aperture 14 and is indicated by the letter B. Thus, proceeding from the portion of the taper 22 adjacent the eye 21 the minor axis of the elongated portion of the aperture 14 decreases at a constant rate until it reaches the neck 23 and thereafter increases abruptly and then again decreases at the same rate of convergence.

A light filter 28 forming a portion of a thin sheet 29 of transparent glass or plastic of uniform thickness is affixed to the blade 10 and the filter 28 extends over the tail 26 of the elongated aperture and is effective to block the transmission of a predetermined percentage of the light waves striking the filter. The minor axis of the tail 26 of the elongated aperture adjacent the neck 23 is increased in direct proportion to the density of the light filter 28 for reasons which will hereinafter become apparent. The sheet 29 also may include a completely transparent portion 29a covering the eye 21 and taper 22. The transparent portion 29a can be provided to make the optical path the same through all portions of the aperture 14.

It is important to understand that while the portion of the glass or plastic film which covers the remainder of the aperture from the tail 26 is completely transparent it would not be feasible in some cases to simply provide a light filter over the tail 26 of the elongated aperture. This is due to the fact that the film and air have different refractive indexes. If no film were disposed over the major portion of the elongated aperture optical differences would occur when the iris blades moved to the point wherein the edge of the light filter intersected the optical path through the camera lens so that differences in focusing on the film would arise with some lens and iris arrangements.

Referring now most particularly to FIGURE 2, a given number of light waves will be transmitted through an iris 34 defined on two sides by portions 30 and 31 of the aperture 14 and on the opposite two sides by construction segments 32 and 33 under predetermined light conditions in a given interval of time. By widening the gap between portions 30 and 31 of the aperture 14 the area of the iris 34 will be so increased that the number of light waves transmitted through the aperture will be greater than under the initial conditions set forth above. It will then be observed that by placing a light transmission filter over the aperture 34 having suitable density the number of light waves may be reduced to the number transmitted through the aperture under the initial conditions set forth above even though the iris is so enlarged. In this manner the gap between portions 30 and 31 of the elongated aperture may be widened while the number of light waves transmitted through the aperture under a given light condition in a given interval of time will remain constant. If the filter is relatively thin as from .0005 to .00025 of an inch and has negligible diffusion characteristics the image produced by the light waves transmitted through the aperture 34 will be clearer under the latter conditions than in the former due to the fact that the proportion of diffracted light waves to the total number of light waves transmitted through the aperture will have been reduced.

In view of the foregoing, it will be apparent that by doubling the size of the diaphragm opening and by placing a filter over the opening having negligible diffusion characteristics which is functional to permit the transmission of only 50% of the light striking the filter therethrough the same amount of light will be directed to the film disposed behind the diaphragm opening but the clarity of the image impinged on the film will be improved due to the fact that the ratio of diffracted light waves to the total number of light waves transmitted through the aperture will be considerably reduced.

As hereinbefore noted, it is not ordinarily desirable to substantially increase the size of the aperture 14 throughout its entire length and to provide a suitable filter therefor since that would necessitate the provision of a larger lens than would normally be used and would therefore result in increased manufacturing expense. On the other hand, this arrangement illustrated provides an extremely compact iris having a minimum diffraction problem.

It has been found desirable to provide diffraction compensation for the diaphragm opening when the area of such opening is approximately equal to or less than .050 of an inch. Although this disclosure has been used for illustrative purposes only, it should not be interpreted as limiting the use of such a diffraction compensation means to diaphragm irises having an area less than .050 of an inch. Thus, for instance, if a filter be used on an iris blade in a camera having a ten millimeter lens which filter is effective to pass only 50% of the light waves therethrough which strike the filter, the exposure aperture may be formed with an opening corresponding to $f/11$ while, in fact, its effective opening will be $f/22$.

Any suitable material may be used in forming the filter which may be formed in relatively thin sheets and which has relatively good optical qualities such as mylar or the like.

In view of the foregoing, it will herein be understood that this embodiment of the invention has been used for illustrative purposes only and that various modifications and variations may be effected without departing from the spirit and scope of the novel concepts thereof.

I claim as my invention:

1. An exposure control mechanism for a photographic camera comprising at least one iris blade having an elongated segmental aperture formed therein operable to define a diaphragm opening, a first segment being defined by edge portions of said blade converging toward a neck, a second segment being defined by edge portions of said blade converging to a vertex from said neck, the greatest minor axis of said second segment being twice as great as the minor axis of said first segment at said neck, the rates of convergence of the edge portions of said blade defining said first and said second segments being equal, and a light transmission filter effective to block the transmission of 50% of the light therethrough which strikes said filter being mounted on said blade and covering said second segment.

2. An exposure control mechanism for a photographic camera comprising at least one iris blade having an elongated segmental aperture formed therein operable to define a diaphragm opening, a first segment being defined by edge portions of said blade converging toward a neck, a second segment being defined by edge portions of said blade converging to a vertex from said neck, the greatest minor axis of said second segment being X times greater than the minor axis of said first segment at said neck, the rates of convergence of the edge portions of said blade defining said first and said second segments being equal, and a light transmission filter on said blade and overlying said second segment and effective to permit transmission of only $$\frac{100\%}{X}$$

of the light therethrough which strikes said filter.

3. An exposure control mechanism for a photographic camera comprising at least one iris blade having an elongated segmental aperture formed therein operable to define a diaphragm opening, a first segment being defined by edge portions of said blade converging toward a neck, a second segment being defined by edge portions of said blade converging to a vertex from said neck, the greatest minor axis of said second segment being X times greater than the minor axis of said first segment at said neck, the rates of convergence of the edge portions of said blade defining said first and said second segments being equal, and a light transmission film of uniform thickness overlying the entire elongated segmental aperture and having a light filtering portion overlying said second segment and effective to permit transmission of only $$\frac{100\%}{X}$$

of the light therethrough which strikes said filter.

References Cited in the file of this patent
UNITED STATES PATENTS 2,841,064    Bagby et al. _____ July 1, 1958

FOREIGN PATENTS 511,229    Great Britain _____ Aug. 15, 1939
941,875    Germany _____ Apr. 19, 1956